United States Patent

[11] 3,583,613

| [72] | Inventor | Irving Gish |
| | | 106-21 Ave. J., Brooklyn, N.Y. 11236 |
| [21] | Appl. No. | 780,686 |
| [22] | Filed | Dec. 3, 1968 |
| [45] | Patented | June 8, 1971 |

[54] PORTABLE AND FOLDABLE LUGGAGE CARRIER
4 Claims, 6 Drawing Figs.

[52] U.S. Cl............................................... 224/42.1,
    224/29
[51] Int. Cl........................................................ B60r 9/04
[50] Field of Search........................................... 224/42.1
    (A), 42.1 (B), 42.1 (E), 42.1 (F), 29, 42.07, 42.34

[56] References Cited
UNITED STATES PATENTS

| 2,387,779 | 10/1945 | Strauss........................ | 224/42.1(E) |
| 2,753,095 | 7/1956 | Barass et al.................. | 224/42.1 (B) |

FOREIGN PATENTS

| 83,183 | 7/1957 | Denmark...................... | 224/42.1(B) |
| 1,021,560 | 12/1952 | France......................... | 224/42.1(E) |
| 1,392,322 | 2/1965 | France......................... | 224/42.1(F) |
| 526,210 | 5/1955 | Italy............................. | 224/42.1(E) |
| 93,664 | 12/1938 | Sweden........................ | 224/42.1(E) |

*Primary Examiner*—Gerald M. Forlenza
*Assistant Examiner*—Frank E. Werner
*Attorney*—Polachek & Saulsbury ABSTRACT: A portable and foldable luggage carrier comprising a plurality of substantially parallel slats spaced at predetermined intervals and adapted to lie on the upper face of the car roof or trunk lid parallel to any of the side edges thereof. Two flexible ropes unite each of the corresponding ends of said slats. Ropes extending across the space between the ropes and along the space between adjacent slats are adapted to contract said two ropes for adjusting the length thereof. Looped rope members on the end edges of the slats and on the long edges of the end slats serve to fasten the ends of ropes adapted to extend over the load on the top of the roof or trunk lid for fastening the load in place. Hooks on the ends of ropes extending radially from the end slats are adapted to fasten the carrier to the side edges of the roof or trunk lid.

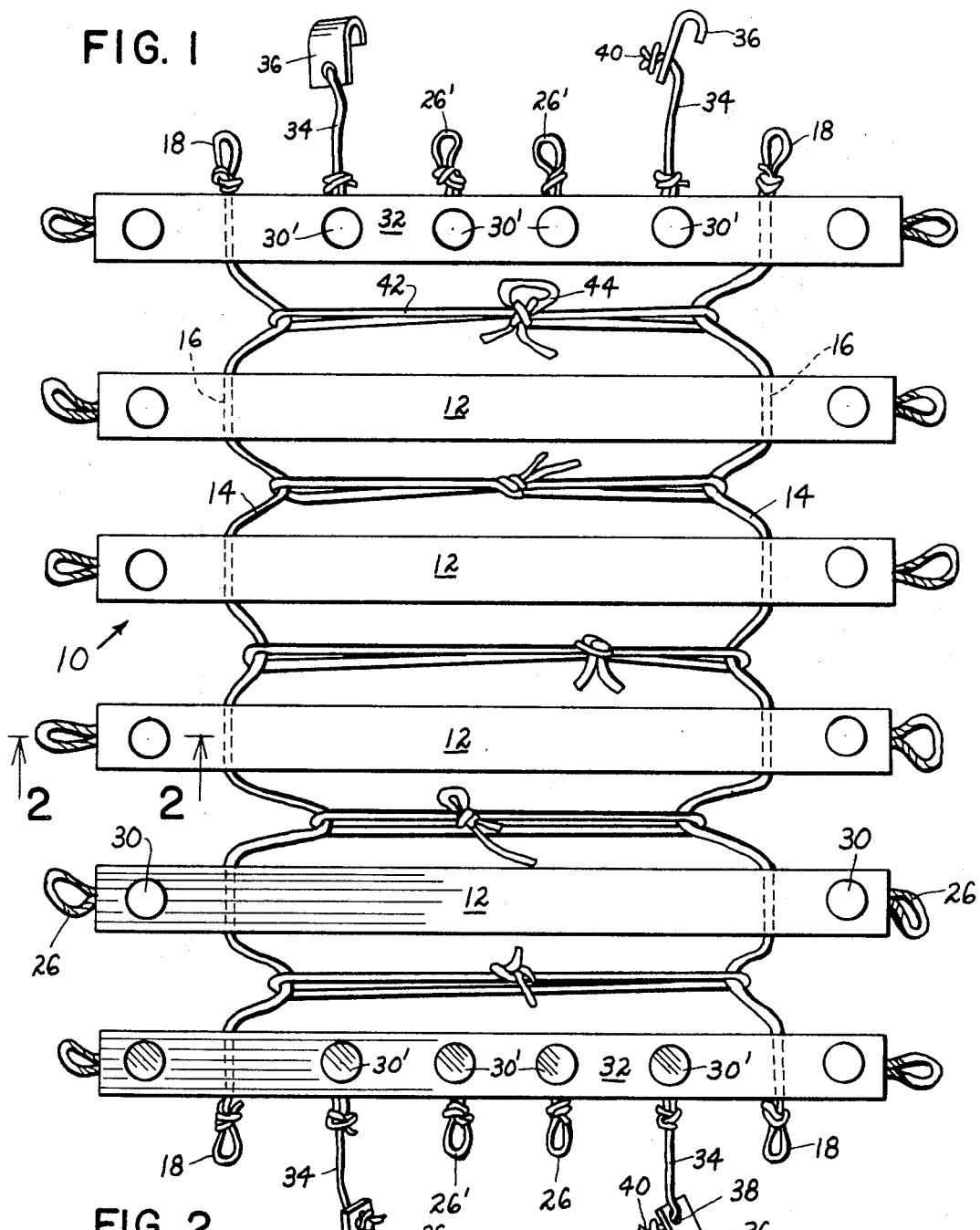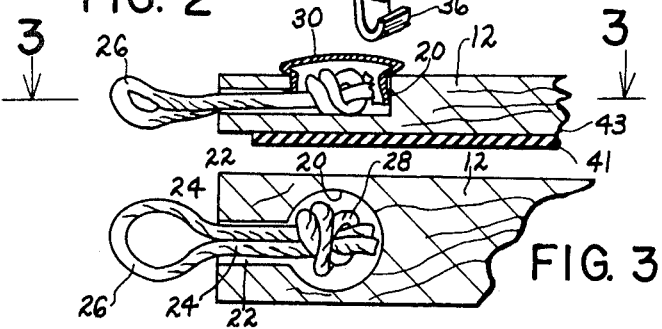

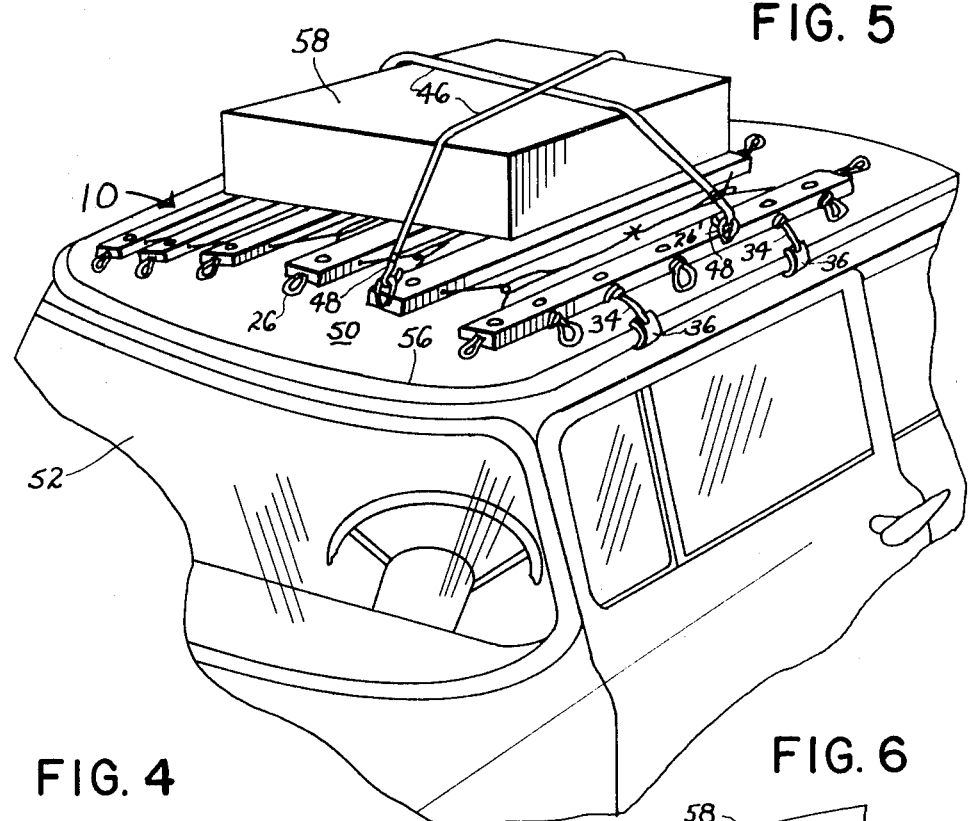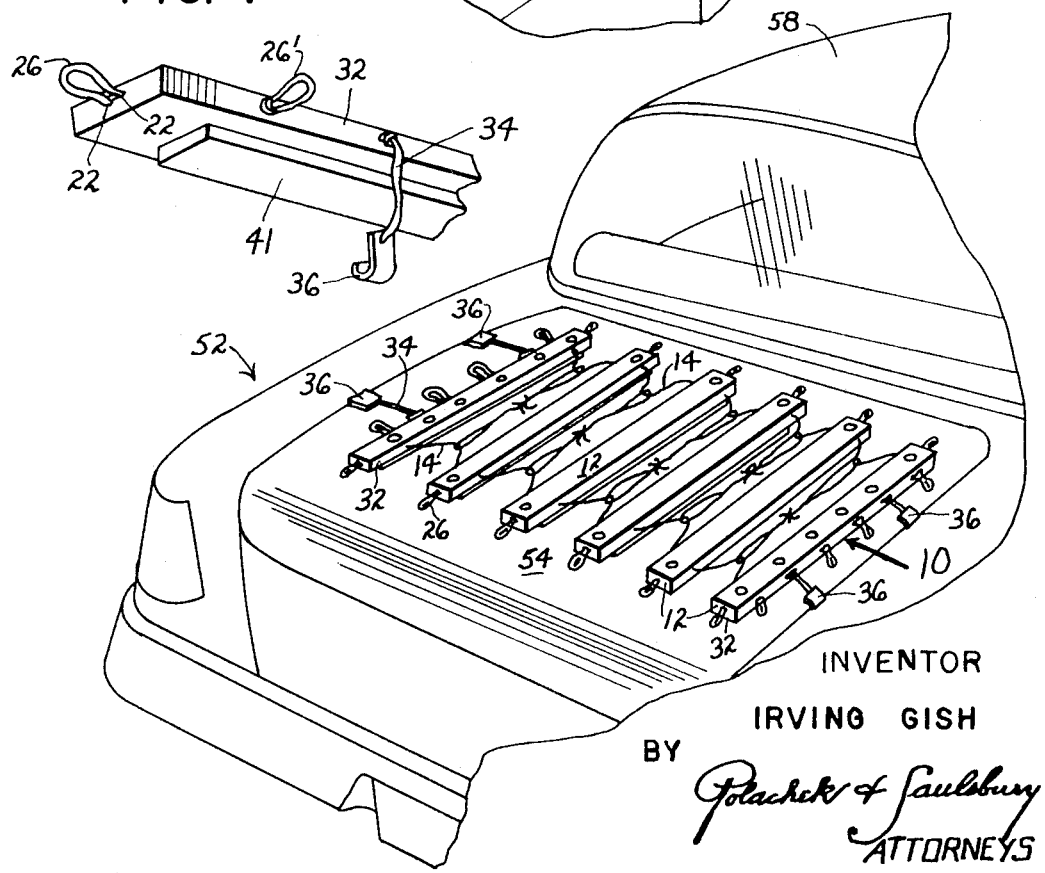

PORTABLE AND FOLDABLE LUGGAGE CARRIER

The present invention relates to a portable and foldable luggage carrier adapted to be easily and removably fixed onto the roof or trunk lid of motorcars of any kind.

A principal object of the present invention is to provide an improved luggage carrier of compact and economical construction particularly adapted for use on the roof and/or trunk lid of a vehicle.

Another object of the invention is to provide a portable and foldable luggage carrier having connecting means facilitating its attachment to and removable from a vehicle, and that is light in weight and readily manipulated to facilitate its quick attachment and removal.

Still another object of the invention is to provide a luggage carrier that is flexible and collapsible and can easily be altered between an expanded load-carrying condition and a contracted or folded compact storage condition whereby it may be readily stored in a minimum of space in the trunk compartment of the vehicle.

Various objects, features and advantages of the invention will become apparent upon reading the following specification together with the accompanying drawing forming a part thereof.

Referring to the drawing:

FIG. 1 is a top plan view of a luggage carrier embodying the invention.

FIG. 2 is an enlarged sectional view taken on line 2-2 of FIG. 1.

FIG. 3 is an enlarged sectional view taken on line 3-3 of FIG. 2.

FIG. 4 is an enlarged bottom perspective view of one end of a slat.

FIG. 5 is a perspective view of the luggage carrier mounted on the roof of a motorcar and showing the manner in which a load may be secured in place on the carrier.

FIG. 6 is a similar view of the luggage carrier mounted on the trunk of the motor car, the load being omitted.

Referring to the views of the drawing in detail, in FIG. 1 a luggage carrier made in accordance with the invention is shown and designated generally at 10. The luggage carrier comprises a plurality of load-supporting slats 12 having a length adequate to the surface of the car roof or trunk lid. The slats are formed of wood, plastic or other suitable material and have a flat-shaped section, that is, they are remarkably wide as compared with their thickness.

The ends of the slats are interconnected in spaced relation by means of nylon ropes 14 extending through passages 16 formed in the slats adjacent the ends thereof. The ends of the ropes are knotted and looped as indicated at 13 to prevent displacement thereof.

Each slat 12 is formed with a transverse opening 20 extending from top to bottom thereof as viewed in FIG. 1 adjacent each end thereof and with a pair of closely spaced passages 22, 22 extending longitudinally thereof and intersecting the end edge of the slat and the adjacent opening 20. A short length of nylon rope is looped upon itself and the reaches 24, 24 thereof extended through the passages leaving loop 26 outside the end of the slat and forming an extension of the slat. The ends of the reaches in opening 20 are knotted and nested in the opening 20 as indicated at 28 to anchor the rope in place. A removable metal closure cup 30 is fitted in the opening 20 closing the top end thereof as viewed in FIG. 1. The cup is inserted downwardly after the knot has been tied in the rope and after the knot is nested in the opening.

The end slats 32, 32 are each formed with a plurality of intermediate transverse openings similar to end openings 20, spaced therealong and with similar pairs of passages similar to passages 22, 22 communicating therewith to receive the reaches of looped short lengths of nylon ropes looped to form radial loops 26' similar to loops 26 and knotted and nested in the openings, the tips of the openings being closed by metal cups 30' similar to cups 30.

The nylon ropes in the two end intermediate openings instead of being looped are extended radially as indicated at 34 for carrying metal hooks 36 on the outer free ends thereof, said outer ends being extended through holes 38 in the metal hooks and being knotted at the ends as indicated at 40 to prevent displacement of the hooks.

The lower face of each of slats 12 and 32 is covered by a strip 41 of foam rubber secured thereto by adhesive 43. The strip covers the bottom ends of the transverse openings 20 in the slats 12 and the bottom ends of the similar openings in the slat 32, 32. These rubber strips prevent marring of the surface of the motorcar.

In accordance with the present invention, a nylon rope 42 is extended across the space between the connecting ropes 14, 14 in the space between the adjacent slats 12 and in the space between slat 12 and the adjacent end slat 32 and is doubled upon itself with its ends knotted as indicated at 44. The ropes 42 shorten the lengths of the ropes 14 to permit adjustment of the lengths thereof to accommodate the carrier to various sizes of roofs and trunk lids.

The loops 26 and 26' are adapted to receive and coact with the ends of one or more separate elongated nylon ropes 46 having hooks 48 fixed on said ends.

In use, the carrier is extended and placed flatwise on the roof 50 of a motorcar 52 or on the trunk lid 54 thereof, as shown in FIGS. 5 and 6, respectively. The hooks 36 on rope extensions 34 are hooked over the edge of the roof gutter 56 on opposite sides of the motorcar, or over the side edges of the trunk lid 54, to secure the carrier in fixed position. A load in the form of a box 58 may be placed on the top surfaces of the slats as shown in FIG. 5 and the nylon ropes 46 extended over the box in crisscross fashion and their end hooks 48 inserted through the end loops 26 and opposed side loops 26' as shown in FIG. 5. The carrier is thus securely fixed in position on the roof or trunk lid and the box load is securely fixed on the carrier on the roof as seen in FIG. 5.

What I claim is:

1. A portable and foldable luggage carrier for mounting on the roof or trunk lid of an automobile said carrier comprising a plurality of substantially parallel load supporting slats spaced from each other, the ends of the slats having transverse passages; flexible members extending across the spaces between said slats and through said passages for flexibly connecting the slats together, flexibly mounted means on the end slats for removably attaching the carrier to a fixed portion of an automobile, and means associated with the slats for receiving flexible fastening members for removably fixing a load to the top of the slats and flexible means for adjusting the length of the flexible members, and elongated strips of foam rubber on the bottom faces of the slats for preventing marring by the slats of the surface of the automobile, said flexible adjusting means are constituted by elongated ropes of nylon extending across the space between the flexible members, over the flexible members toward each other with their ends knotted.

2. A portable and foldable luggage carrier for mounting on the roof or trunk lid of an automobile said carrier comprising a plurality of substantially parallel load-supporting slats spaced from each other, the ends of the slats having transverse passages, flexible members extending across the spaces between said slats and through said passages for flexibly connecting the slats together, flexibly mounted means on the end slats for removably attaching the carrier to a fixed portion of an automobile, and means associated with the slats for receiving flexible fastening members for removably fixing a load to the top of the slats, said means associated with the slats for receiving flexible fastening members comprise rope loops mounted on the ends of the slats forming extensions thereof, and rope loops fixed radially on the outer long edges of the end slats, and elongated flexible nylon ropes having metal hooks on the ends thereof adapted to engage in said rope loops.

3. A portable and foldable luggage carrier for mounting on the roof or trunk lid of an automobile as defined in claim 2, wherein the mounting of the end rope loops includes openings in the slats adjacent the ends thereof extending from the top to the bottom thereof, each slat ends having a pair of closely spaced passages extending from the end edge thereof inwardly intersecting the adjacent opening, the reaches of the rope loops extending through said passages and the ends thereof knotted and nested in the opening; and a removable metal cup closing one end of the opening.

4. A portable foldable luggage carrier for mounting on the roof or trunk lid of an automobile as defined in claim 3, and elongated strips of foam rubber on the bottom faces of the slats for closing the bottom ends of said openings in the slats and for preventing marring by the slats of the surface of the automobile.